US012315935B2

(12) United States Patent
Morin et al.

(10) Patent No.: US 12,315,935 B2
(45) Date of Patent: May 27, 2025

(54) BATTERY WITH METALLIZED FILM CURRENT COLLECTOR HAVING LOW INTERNAL RESISTANCE

(71) Applicants: Brian G. Morin, Greenville, SC (US); Carl C. Hu, Taylors, SC (US)

(72) Inventors: Brian G. Morin, Greenville, SC (US); Carl C. Hu, Taylors, SC (US)

(73) Assignee: Soteria Battery Innovation Group, Inc., Greenville, SC (US)

( * ) Notice: Subject to any disclaimer, the term of this patent is extended or adjusted under 35 U.S.C. 154(b) by 0 days.

(21) Appl. No.: 16/698,936

(22) Filed: Nov. 27, 2019

(65) Prior Publication Data

US 2021/0159507 A1    May 27, 2021

(51) Int. Cl.
*H01M 4/66* (2006.01)
*H01M 4/02* (2006.01)
*H01M 10/0525* (2010.01)

(52) U.S. Cl.
CPC .......... *H01M 4/667* (2013.01); *H01M 4/661* (2013.01); *H01M 10/0525* (2013.01); *H01M 2004/021* (2013.01)

(58) Field of Classification Search
CPC ................ H01M 4/667; H01M 4/661; H01M 2004/021; H01M 10/0525
See application file for complete search history.

(56) References Cited

U.S. PATENT DOCUMENTS

| 2018/0198132 A1* | 7/2018 | Liang .................... H01M 4/668 |
| 2019/0081315 A1* | 3/2019 | Morin ............... H01M 10/0525 |
| 2019/0173089 A1* | 6/2019 | Liang .................. H01M 10/486 |

FOREIGN PATENT DOCUMENTS

| JP | 09283149 A | 10/1997 |
| JP | 1167221 A | 3/1999 |
| JP | 2019175652 | * 10/2019 |
| JP | 2019175652 A | * 10/2019 |
| WO | WO2019103874 | * 5/2019 |

* cited by examiner

*Primary Examiner* — Daniel S Gatewood
(74) *Attorney, Agent, or Firm* — Joseph T. Guy; Patent Filing Specialist Inc.

(57) ABSTRACT

Improvements in the structural components and physical characteristics of lithium battery articles are provided. Standard lithium ion batteries, for example, are prone to certain phenomena related to short circuiting and have experienced high temperature occurrences and ultimate firing as a result. Structural concerns with battery components have been found to contribute to such problems. Improvements provided herein include the utilization of thin metallized current collectors (aluminum and/or copper, as examples), high shrinkage rate materials, materials that become nonconductive upon exposure to high temperatures, and combinations thereof. Such improvements accord the ability to withstand certain imperfections (dendrites, unexpected electrical surges, etc.) within the target lithium battery through provision of ostensibly an internal fuse within the subject lithium batteries themselves that prevents undesirable high temperature results from short circuits. Battery articles and methods of use thereof including such improvements are also encompassed within this disclosure.

7 Claims, 5 Drawing Sheets

Prior Art

Fig. 1 – Wound Cell

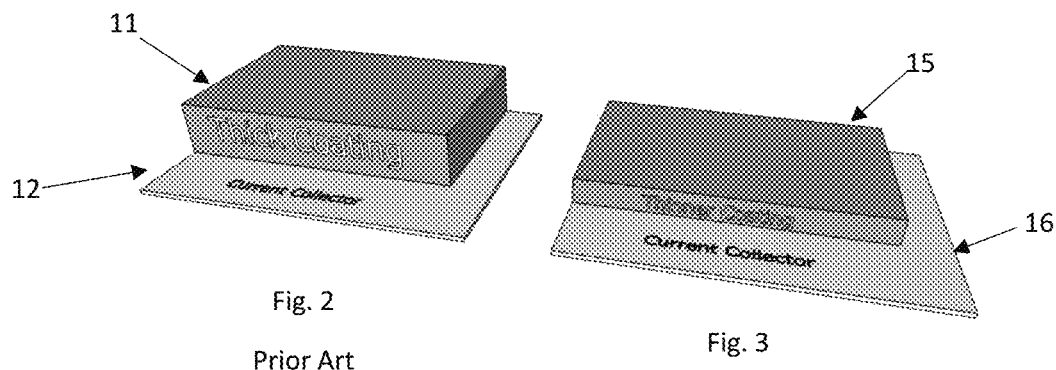
Fig. 2
Prior Art
Fig. 3
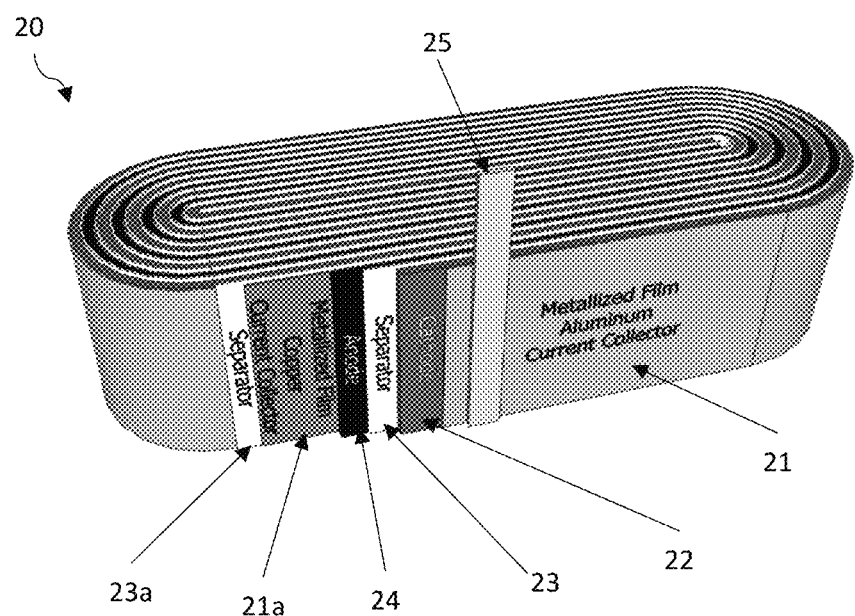
Fig. 4

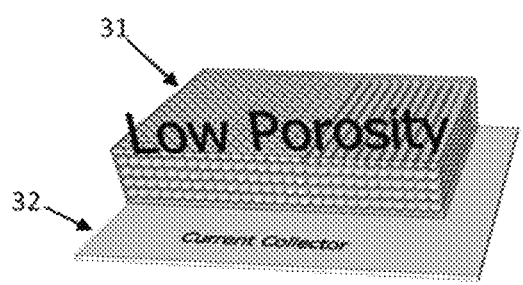
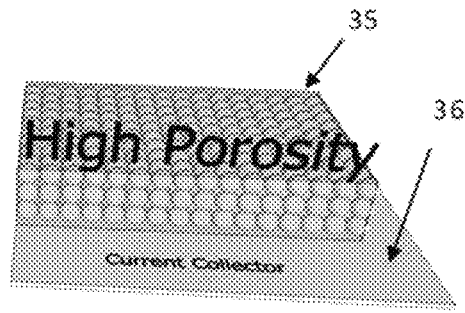
Fig. 5
Prior Art
Fig. 6
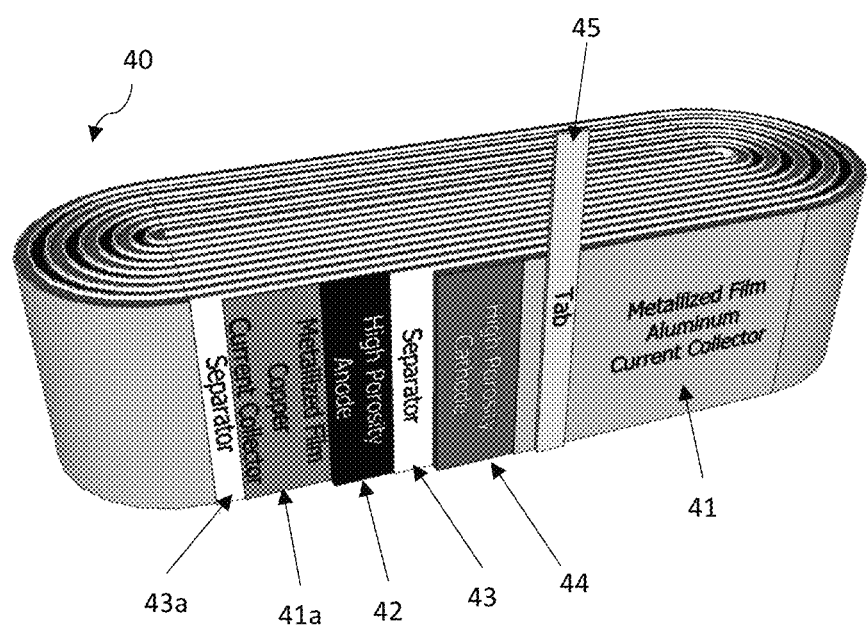
Fig. 7

BATTERY WITH METALLIZED FILM CURRENT COLLECTOR HAVING LOW INTERNAL RESISTANCE

FIELD OF THE INVENTION

The present disclosure relates to improvements in the structural components and physical characteristics of lithium ion battery articles to accord lower resistance than within standard rechargeable battery types (such as high-power lithium ion battery types, as one example). Such structural modifications relate to thinner metal current collector structures that increase internal resistance levels of a battery cell and the concomitant decrease in internal cell resistance through modifications of electrode coatings as an accommodation in that respect. The utilization of low thickness electrodes, high porosity electrodes, higher conductivity electrode coatings, multi-layered electrode coatings with differing levels of conductive materials therein, and patterned coatings with differing resistance regions for directed results, all function in this respect simultaneously with thin metallized current collectors. Battery articles and methods of use thereof including such improvements are also encompassed within this disclosure.

BACKGROUND OF THE PRIOR ART

Rechargeable power cells (such as, without limitation, lithium ion batteries) are prevalent around the world as an electricity source and are growing in importance within a myriad of products. From rechargeable power tools, to electronic cars, to the ubiquitous cellular telephone (and like tablets, hand-held computers, etc.), to lithium ion batteries (of different ion types) are utilized as the primary power source due to reliability, the above-noted rechargeability, and longevity of usage. With such widely utilized power sources, however, comes certain problems, some of which have proven increasingly serious. Notably, safety issues have come to light wherein certain imperfections within such lithium batteries, whether due to initial manufacturing issues or time-related degradation problems, cause susceptibility to firing potentials during short circuit events. Basically, internal defects with conductive materials have been found to create undesirable high heat and, ultimately, fire, within such battery structures. As a result, certain products utilizing lithium batteries, from hand-held computerized devices (the Samsung Galaxy Note 7, as one infamous situation) to entire airplanes (the Boeing 787) have been banned from sales and/or usage until solutions to compromised lithium batteries used therein and therewith have been provided (and even to the extent that the Samsung Galaxy Note 7 has been banned from any airplanes in certain regions). Even the Tesla line of electric cars have exhibited notable problems with lithium battery components, leading to headline-grabbing stories of such expensive vehicles exploding as fireballs due to battery issues. Widespread recalls or outright bans thus remain today in relation to such lithium battery issues, leading to a significant need to overcome such problems.

These problems primarily exist due to manufacturing issues, whether in terms of individual battery components as made or as such components are constructed as individual batteries themselves. Looked at more closely, lithium batteries are currently made from six primary components, a cathode material, a cathode current collector (such as aluminum foil) on which the cathode material is coated, an anode material, an anode current collector (such as copper foil) on which the anode material is coated, a separator situated between each anode and cathode layer and typically made from a plastic material, and an electrolyte as a conductive organic solvent that saturates the other materials thereby providing a mechanism for the ions to conduct between the anode and cathode. These materials are typically wound together into a can, as shown in Prior Art FIG. 1, or stacked. There are many other configurations that are and may be utilized for such battery production purposes, including pouch cells, prismatic cells, coin cells, cylindrical cells, wound prismatic cells, wound pouch cells, and the list goes on. These battery cells, when made correctly and handled gently, can provide energy for various applications for thousands of charge-discharge cycles without any appreciable safety incident. However, as alluded to above, certain events and, in particular, certain defects can cause internal shorting between the internal conductive materials which can lead to heat generation and internal thermal runaway, known to be the ultimate cause of fire hazards within such lithium batteries. Such events may further be caused by, as noted above, internal defects including the presence of metallic particles within the battery, burrs on the current collector materials, thin spots or holes in the separator (whether included or caused during subsequent processing), misalignments of battery layers (leaving "openings" for unwanted conductivity to occur), external debris penetrating the battery (such as road debris impacting a moving vehicle), crushing and/or destabilizing of the cell itself (due to accidents, for instance), charging the cell in a confined space, and the like. Generally speaking, these types of defects are known to cause generation of a small electronic conductive pathway between the anode and cathode. When such an event occurs, if the cell is then charged, such a conductive pathway may then cause a discharge of the cell therethrough which ultimately generates excessive heat, thereby compromising the battery structure and jeopardizing the underlying device being powered thereby. Combined with the presence of flammable organic solvent materials as battery electrolytes (which are generally of necessity for battery operability), such excessive heat has been shown to cause ignition thereto, ultimately creating a very dangerous situation. Such problems are difficult to control once started, at the very least, and have led to significant injuries to consumers. Such a potential disastrous situation is certainly to be avoided through the provision of a battery that delivers electrical energy while not compromising the flammable organic electrolyte in such a manner.

The generation of excessive heat internally may further create shrinkage of the plastic separator, causing it to move away from, detach, or otherwise increase the area of a short within the battery. In such a situation, the greater exposed short area within the battery may lead to continued current and increased heating therein, leading to the high temperature event which causes significant damage to the cell, including bursting, venting, and even flames and fire. Such damage is particularly problematic as the potential for firing and worse comes quickly and may cause the battery and potentially the underlying device to suffer an explosion as a result, putting a user in significant danger as well.

Lithium batteries (of many varied types) are particularly susceptible to problems in relation to short circuiting. Typical batteries have a propensity to exhibit increased discharge rates with high temperature exposures, leading to uncontrolled (runaway) flaring and firing on occasion, as noted above. Because of these possibilities, certain regulations have been put into effect to govern the actual utilization, storage, even transport of such battery articles. The ability to effectuate a proper protocol to prevent such runaway events related to short circuiting is of enormous importance, certainly. The problem has remained, however, as to how to actually corral such issues, particularly when component production is provided from myriad suppliers and from many different locations around the world.

Some prior disclosures have alluded to the utilization of metallized films as current collector structures within lithium ion batteries, including Japanese Patent Application No. 11410796. Such a disclosure, as well as others made much recently, are very limited in terms of providing for internal resistance within the subject power cell itself without any other structural modifications as accommodation thereto. For example, CATL has very recently taught the utilization of thin current collector films (metallized) for safety purposes; however, such utilization has been limited to the effect that, as noted above, a very thin metal coating which results in high internal resistance is needed. As such, this CATL disclosure is limited to defining the needed level of internal resistance of the cell R related to the capacity of the cell CAP as a product of R×CAP higher than a specific parameter, in this case 40. In this instant disclosure, however, and in all cases wherein the "capacity" of the cell is referred to, such measurements are made at a rate of 0.2 C or slower. Such a high internal resistance can contribute to good safety performance in a lithium ion battery as such a level can reduce current flow in the presence of an internal or damage-induced short. Certainly, the higher the internal resistance, the lower the current flow which reduces the rate of heat generation due to such a short, thereby reducing the chances the cell will be driven to thermal runaway as a result. It is therefore quite novel and contrary to this specific CATL teaching (achieving high safety associated with the utilization of ultra-thin metal coatings on metallized films with high resistance results) that it has now been realized that such thin metallized film current collectors can be utilized in association with a power generating cell simultaneously exhibiting low internal resistance.

As such, it is commonly considered that such reduced metal amounts (from monolith to metallized film, for example) necessarily contributes to the increased internal resistance of the target power cell, and thereby improves the safety thereof. Thus, the standard as it concerns such metallized film utilization within lithium ion batteries, and the like, is that the only way to achieve such safety levels (prevent thermal runaway, for example) is the provision of cells with high internal resistance and that such a high level of resistance is the source of improved safety in this respect.

It has been found, however, that low internal resistance cells are necessary to deliver or receive high power, in essence permitting improved safety but simultaneously according a needed power level for viability of such rechargeable cells within the industry itself. For example, as it concerns electric vehicles, certainly there have been events exhibiting the problems associated with thermal runaway due to manufacturing and/or damage-induced shorts within the rechargeable batteries themselves. With the utilization of high internal resistance metallized film current collectors, the propensity for such thermal runaway occurrences are reduced, but the loss in power, thereby reducing the effectiveness of recharging and/or the duration of usefulness of the charged batteries for high level activation and utilization are basically compromised. High power reception is basically necessary to achieve and effective and fast charge within such an electric vehicle, in other words. Again, the viability of utilization coupled with safety is difficult to achieve with the sole goal of providing high internal resistance within such high-power battery applications. Hybrid electric vehicle require extremely quick recharging capabilities, as well, thus needing a similar high-power recharging level (while still necessitating improved safety, too). Electric aircraft, for that matter, such as drones, air taxies, and the like, require very high-power levels for liftoff and landing, at least, with safety considerations. The same issues arise as it concerns the fast-charge capabilities of batteries within cellular phones, laptops, and other devices, as well, and certainly as it concerns the issues of safety due to possibly shorts and thermal runaway. In other words, the need for safety through thinner metal current collector structures is needed, but the state of the art in that respect overcompensates in a sense that power levels are compromised to too great an extent for such limited thin-film current collector considerations to be the solution on their own within the rechargeable power cell industry.

Additionally, the ability to reduce initial current collector structural weight certainly helps in some ways through a reduction of overall weight of a target cell. Again, though, this limited modification does not allow for high-power enhancements as this structural modification accords the generation of high internal resistance in the target cell without any further compensation for a lack of power generation. The further ability to create power increases with concomitant weight reductions would be a further unexpected improvement. To date, however, as noted above, the only weight reductions for such power cells are related to safety through high internal resistance increases alone. The present disclosure provides such a highly desirable cure making lithium battery cells extremely safe, reliable, and viable for high-power devices within multiple markets.

Advantages and Summary of the Disclosure

A distinct advantage of this disclosure is the ability through structural components to provide a mechanism to break the conductive pathway when an internal short occurs, stopping or greatly reducing the flow of current that may generate heat within the target battery cell. Another advantage is the ability to provide such a protective structural format within a lithium battery cell that also provides beneficial weight and cost improvements for the overall cell manufacture, transport and utilization. Thus, another advantage is the generation and retention of an internal fuse structure within a target battery cell until the need for activation thereof is necessitated. Another advantage is the provision of a low internal resistance high-power cell with a high resistance thin metal current collector for a fast charge and discharge capability. Still another advantage is the ability to utilize flammable organic electrolytes materials within a battery without any appreciable propensity for ignition thereof during a short circuit or like event.

Accordingly, this inventive disclosure encompasses an electrochemical energy generating and storage device (power cell, rechargeable battery, and the like) comprising an anode, a cathode, at least one separator present between said anode and said cathode, an electrolyte, and at least one current collector in contact with at least one of said anode and said cathode; wherein said current collector exhibits a resistivity greater than 0.005 Ohm/square (preferably greater than 0.01, more preferably greater than 0.015, and most preferably at least 0.025 Ohms/square); wherein said device exhibits a capacity CAP and resistance R, such that the product CAP×R is less than 40 mOhm-Ah (preferably less than 35, more preferably less than 30, still more preferably less than 25, and most preferably less than 20 mOhm-Ah);

and wherein said electrochemical device exhibits a 2 C capacity greater than 70% of the capacity measured at 0.2 C (where 2 C denotes a 30 minute discharge and 0.2 C denotes a 5 hour discharge)(preferably greater than 75%, more preferably greater than 80%, still more preferably greater than 85%, and most preferably greater than 90%). Alternatively, such a device may exhibit a resistance less than 15 mOhms (preferably less than 12, more preferably less than 10, still more preferably less than 8, even more preferably less than 6, and most preferably less than 4 mOhms). Of course, larger cells will naturally exhibit lower internal resistance, so it is desirable to achieve cells with a high capacity and low internal resistance. Thus, the cell may have both a low resistance target as well as a capacity target, with higher resistances allowed for lower capacity limitations. The capacity may be limited to be below 5 Ah, preferably below 20 Ah, more preferably below 40 Ah, even more preferably below 100 Ah, and most preferably below 200 Ah. Such an example might include a cell which is restricted in capacity to be below 10 Ah and a resistance below 10 mOhms. Alternatively, as well, such a device may exhibit an electrode areal energy density less than 4.0 mAh/cm$^2$ (preferably less than 3.5, more preferably less than 3.0, still more preferably less than 2.5, even more preferably less than 2.0, yet more preferably less than 1.5 and most preferably less than 1.0 mAh/cm$^2$. In such a unique device, the current collector exhibits a certain increased resistance while the entire device exhibits a certain decreased resistance, or, alternatively, a capacity and/or electrode areal energy density that counterintuitively meets certain limitations that have not been undertaken in the past. Such a difference between increased resistance with a current collector and differing physical characteristics of the device associated with the electrode structure(s) provides such novel measurements that accord higher power (for charge and discharge) for the entire device with a high resistance (low thickness and weight current collector) simultaneously.

Of further consideration and unexpected discovery with regard to such electrochemical power generating and storage devices are the ability to provide electrode structures with nonconductive current collector components as polymer films or fabrics with metal layers on each of the top and bottom surfaces thereof wherein the anode and/or cathode (as electrodes with one contacting said current collector) provided with one or more of the following physical structures: a) a porous electrode exhibiting a porosity of at least 35% (more preferably at least 40%, still more preferably at least 45%, even more preferably at least 50%, and most preferably at least 55%); b) an electrode coating, wherein such a coating comprises a higher loading or higher conductivity additive within the electrode material, wherein said conductive additive may be graphite, carbon, or the like, and present at loadings of greater than 6% by weight thereof (preferably greater than 8%, more preferably greater than 10%, and most preferably greater than 12% by weight thereof), and/or wherein said high conductivity materials may also comprise metal particles and/or high aspect ratio conductive materials (such as nanotubes and/or carbon nanofibers); c) multi-layer electrodes, with the top layer having higher conductivity (or carbon content) than each successive lower layer; d) a multi-layer electrode, with the top layer exhibiting higher porosity than each successive lower layer; and e) a patterned electrode, wherein part of the electrode consists of high energy (low conductivity) regions interspersed with higher conductivity regions, wherein such conductivity gradients are achieved either by different conductive material content levels or material types, or by differing porosity measurements with higher and lower gradients present therein. Such patterned coatings may be laid down by various printing techniques which allow patterns of different materials to be achieved, as are well known in the art. Such multilayer structures may be produced by multiple passes, each depositing a single layer, or alternatively through coextrusion of multiple layers of materials through a single orifice or print head.

Therefore, it is another significant advantage of the present disclosure to provide an initial thin metallized film current collector that drastically limits the delivery time of a current level applied to the target current collector surface through a probe tip (in order to controllably emulate the effect of an internal manufacturing defect, a dendrite, or an external event which causes an internal short within the subject battery) to less than 1 second, preferably less than 0.01 seconds, more preferably less than 1 millisecond, and most preferably, perhaps, even less than 100 microseconds, particularly for much larger currents. Of course, such a current would be limited to the internal voltage of the cell, which might be 5.0 V, or 4.5 V, or 4.2 V or even less, such as 4.0 V or 3.8 V, but with a minimum of 2.0 V.

Such a metallized film current collector may be provided exhibiting a total thickness (of an entire metallized polymeric substrate) less than 20 microns, potentially preferably less than 15 microns, and potentially more preferably less than 10 microns, potentially even more preferably less than 8 microns, potentially still more preferably less than 6 microns, and potentially most preferably less than 4 microns, all with a resistivity measurement greater than 0.005 Ohm/square (preferably greater than 0.01, more preferably greater than 0.015, and most preferably at least 0.025 Ohms/square). Typical current collectors may exhibit these features but do so at far higher weight than those made with reinforcing polymeric substrates and without the inherent safety advantages of this presently disclosed variation. For example, a copper foil at 10 microns thick may weight 90 grams/m$^2$. However, a copperized foil may weight as little as 50 grams/m$^2$, or even as little as 30 gram/m$^2$, or even less than 20 grams/m$^2$, all while delivering adequate electrical performance required for the cell to function (albeit with high internal resistance for the device itself). In this alternative structure, however, the very thin component also allows for a short to react with the metal coat and in relation to the overall resistance levels to generate, with an excessively high temperature due to a current spike during such a short, a localized region of metal oxide that immediately prevents any further current movement therefrom. The resistance level remains high, however, as the thin structures exhibit such physical results.

Another possible alternative for such a high resistance current collector is the provision of a temperature dependent metal (or metallized) material that either shrinks from a heat source during a short or easily degrades at the specific material location into a nonconductive material (such as aluminum oxide from the aluminum current collector, as one example)(as alluded to above in a different manner). In this way, the current collector becomes thermally weak, in stark contrast to the aluminum and copper current collectors that are used today, which are quite thermally stable to high temperatures. As a result, an alloy of a metal with a lower inherent melting temperature may degrade under lower shorting current densities, improving the safety advantages of the lithium-based energy device disclosed herein. Another alternative is to manufacture the current collector by coating a layer of conductive material, for example copper or aluminum, on fibers or films that exhibit relatively high shrinkage rates at relatively low temperatures. Examples of these include thermoplastic films with melt temperatures below 250° C., or even 200° C., and can include as non-limiting examples polyethylene terephthalate, nylon, polyethylene or polypropylene. Another possible manner of accomplishing such a result is to manufacture a current collector by coating a layer of conductive material, for example copper or aluminum, as above, on fibers or films that can swell or dissolve in electrolyte when the materials are heated to relatively high temperatures compared to the operating temperatures of the cells, but low compared to the temperatures that might cause thermal runaway. Examples of such polymers that can swell in lithium ion electrolytes include polyvinylidiene fluoride and poly acrylonitrile, but there are others known to those with knowledge of the art. Yet another way to accomplish such an alternative internal electrical fuse generating process is to coat onto a substrate a metal, for example aluminum, that can oxidize under heat, at a total metal thickness that is much lower than usually used for lithium batteries. For example, a very thin aluminum current collector as used today may be 20 microns thick. A coating thickness of a total of less than 5 microns would break the circuit faster, and one less than 2 microns, or even less than 1 micron, or even less than 700 nm, or 500 nm would break the circuit even faster. Such a coating must also have enough metal to provide sufficient conductivity to energize the cell, and so should have a thickness greater than 10 nm, preferably greater than 50 nm, or even greater than 100 nm, or most preferably greater than 200 nm. Such use of thin conductive coatings, when combined with low thickness polymer substrates, will result in extremely low current collector areal density. As such, the areal density may be lower than 30 grams/square meter, preferably lower than 25, more preferably lower than 20, and most preferably lower than 15 grams/square meter. Even still, another way to accomplish the break in conductive pathway is to provide a current collector with limited conductivity that will degrade in the high current densities that surround a short, similar to the degradation found today in commercial fuses. This could be accomplished by providing a thin metallized film current collector with a resistivity of greater than 5 mOhm/square, or 10 mOhm/square, or potentially preferably greater than 20 mOhm/square, or, a potentially more preferred level of greater than 50 mOhm/square. Such resistivities contribute, again, as alluded to above, a high internal resistance that may compromise, on its own, and without any compensation therefore, the power generating and delivery capabilities of the target cell. To overcome such high resistance challenges, past modifications have simply modified current collector resistivities. Such involved thicknesses and materials and did not consider any change to electrode types, thicknesses, materials, or, for that matter, resistivities may further be selected differently for batteries that are designed for high power, which might use a relatively low resistance compared to cells designed for lower power and higher energy, and/or which might use a relatively high resistance. Still another way to accomplish the break in conductive pathway is to provide a current collector that will oxidize into a non-conductive material at temperatures that are far lower than aluminum, thus allowing the current collector to become inert in the area of the short before the separator degrades. Certain alloys of aluminum will oxidize faster than aluminum itself, and these alloys would cause the conductive pathway to deteriorate faster or at a lower temperature. As possible alternatives, there may be employed any type of metal in such a thin current collector layer capacity and that exhibits electrical conductivity, including, without limitation, gold, silver, vanadium, rubidium, iridium, indium, platinum, and others (basically, with a very thin current collector layer, the costs associated with such metal usage may be reduced drastically without sacrificing conductivity and yet still allowing for the protections from thermal runaway potentials during a short circuit or like event). As well, layers of different metals may be employed or even discrete regions of metal deposited within or as separate layer components may be utilized. Certainly, too, one side of such a coated current collector substrate may include different metal species from the opposing side, and may also have different layer thicknesses in comparison, as well.

In any event, the ability to utilize a metallized film current collector (as opposed to a thick metal structure) contributes to reductions in thermal runaway possibilities for rechargeable batteries (as disclosed, for example within co-pending U.S. patent application Ser. No. 15/700,077, the entirety of which is herein incorporated by reference). However, again, as noted previously, such thin structures create a high resistance level for the target electrochemical cell (battery, etc.) that compromises the devices ability to deliver high power, fast charging, and quick discharging as needed within certain end-use applications. As such, there is a distinct need to provide a manner of reducing the overall resistance of the device itself, particularly as it concerns liquid electrolyte cells. The present disclosure is directed to such an improvement in that regard. Standard electrochemical cells include current collector structures, separators, and electrodes (anode and cathode) for electrical charge generation. The utilization of thin metallized films as current collectors has been limited to such standard structures (note the Japanese reference cited above) with typical electrode structures and separators, as well. These typical electrodes are of metal layers of significant thickness to provide overall stability to the cell (device) as well as to allow for high resistance levels internally as well. Counterintuitive to these standard battery cells (electrochemical devices), however, it has been unexpectedly found that the utilization of certain unexplored electrode material coatings on metallized film current collectors. As such, it is now presented the different manners of providing such thin current collectors for safety (and high resistance levels) with such material coatings on such current collectors to provide effective resistance lowering structures in order to generate power quickly and to move such quickly as well to an outside device.

To that end, as alluded to above, the materials associated with such unexpectedly and counterintuitively utilized resistance-lowering electrodes have been found to rely upon coatings applied to the metallized current collector film(s), including those with specific thicknesses, high porosity levels, high conductivity levels, multi-layered structures with conductivity gradients therein, and patterned coatings having regions of differing conductivity gradients, as well. Such a novel approach accords, in each instance, not only a lower internal resistance for the target electrochemical cell, but also the potential for significantly reduced weight of such structures (coupled, as well, with the current collectors films in such respect) for not only a compensation for increased resistance associated with thin current collectors metallized films, but also an attractive weight reduction for the overall cell (device), as well.

Such advantages allow for low-weight, high safety level, and high power generating (charging and discharging) rechargeable electrochemical cells (lithium ion batteries, and the like, as non-limiting examples) that have heretofore been nonexistent within the pertinent industries. In any of the alternative configurations discussed herein, such a thin metallized film current collector functions ostensibly as an internal fuse within a target energy storage device (e.g., lithium battery, capacitor, etc.). In each instance (alternative), the electrode coatings applied thereto enhance the overall thin structure to a level that accords sufficient strength for structural stability within the target cell (device) but with the simultaneous capability of reducing the internal resistance of the overall cell in relation to the increased resistance of the thin metallized film current collector. Thus, the ability to provide simultaneously safety measures in relation to shorts and potential thermal runaway events with significant high power generation results meets a need that has, again, heretofore been unexplored.

Such methodologies and structures are discussed in greater detail below.

The ion storage material can for example be a cathode or anode material for lithium ion batteries, as are well known in the art. Cathode materials may include lithium cobalt oxide $LiCoO_2$, lithium iron phosphate $LiFePO_4$, lithium manganese oxide $LiMn_2O_4$, lithium nickel manganese cobalt oxide $LiNi_xMn_yCo_zO_2$, lithium nickel cobalt aluminum oxide $LiNi_xCo_yAl_zO_2$, or mixtures of the above or others as are known in the art. Anode materials may include graphite, lithium titanate $Li_4Ti_5O_{12}$, hard carbon, tin, silicon or mixtures thereof or others as are known in the art. In addition, the ion storage material could include those used in other energy storage devices, such as supercapacitors. In such supercapacitors, the ion storage materials will include activated carbon, activated carbon fibers, carbide-derived carbon, carbon aerogel, graphite, graphene, graphene, and carbon nanotubes.

The coating process can be any coating process that is generally known in the art. Knife-over-roll and slot die are commonly used coating processes for lithium ion batteries, but others may be used as well, including electroless plating. In the coating process, the ion storage material is in general mixed with other materials, including binders such as polyvinylidene fluoride or carboxymethyl cellulose, or other film-forming polymers. Other additives to the mixture include carbon black and other conducting additives.

Connecting the means to make electrical contact with the metallized substrate can include commonly used methods, such as welding, taping, clamping, stapling, riveting, or other mechanical means. Because the metal of the metallized substrate can be very thin, in order to enable an interface that allows for high current flow, a face-to-face contact is generally required, giving high surface area between the means of making electrical contact through the case and the metallized substrate. To carry sufficient current, this surface area should be higher than 1 square millimeter ($10^{-12}$ square meters) but may need to be higher than 3 square millimeters, or even 5 square millimeters or more preferably 10 square millimeters.

The liquid electrolyte is typically a combination/mixture of a polar solvent and a lithium salt. Commonly used polar solvents include, as noted above, propylene carbonate, ethylene carbonate, dimethyl carbonate, diethyl carbonate, but other polar solvents, including ionic liquids or even water may be used. Lithium salts commonly utilized within this industry include, without limitation, $LiPF_6$, $LiPF_4$, $LiBF_4$, $LiClO_4$ and others. The electrolyte may also contain additives as are known in the art. In many cases, the electrolytes can be flammable, in which the safety features of the inventive metallized substrate current collectors can be advantageous preventing dangerous thermal runaway events which result in fire and damage both to the cell and external to the cell.

BRIEF DESCRIPTION OF THE DRAWINGS

FIG. 2 is a depiction of a Prior Art depiction of a side perspective view of the utilization of a thick coating electrode on a thin metallized film current collector.

FIG. 3 is a depiction of a herein disclosed side perspective view of a thin coating electrode applied to a thin metallized film current collector.

FIG. 4 is a top cross-sectional view of a jelly roll type lithium ion rechargeable battery including the electrode/metallized film current collector of FIG. 3.

FIG. 5 is a depiction of a Prior Art depiction of a side perspective view of the utilization of a low porosity coating electrode on a thin metallized film current collector.

FIG. 6 is a depiction of a herein disclosed side perspective view of a high porosity coating electrode applied to a thin metallized film current collector.

FIG. 7 is a top cross-sectional view of a jelly roll type lithium ion rechargeable battery including the high porosity electrode/metallized film current collector of FIG. 6.

DETAILED DESCRIPTION OF THE PREFERRED EMBODIMENTS AND EXAMPLES

Figure 1:
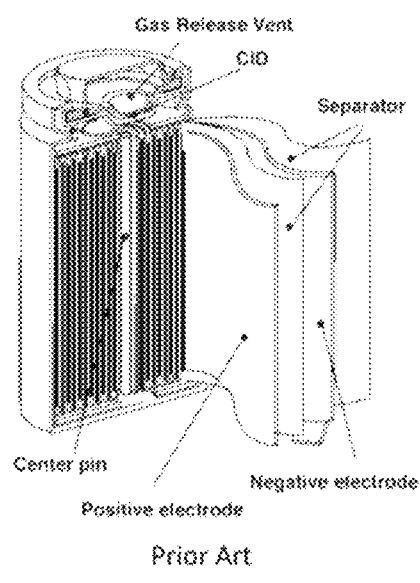
FIG. 1 is a Prior Art depiction of the architecture of a wound cell, such as an 18650 cell.

The following descriptions and examples are merely representations of potential embodiments of the present disclosure. The scope of such a disclosure and the breadth thereof in terms of claims following below would be well understood by the ordinarily skilled artisan within this area.

As noted above, the present disclosure is a major shift and is counterintuitive from all prior understandings and remedies undertaken within the lithium battery (and other energy storage device) industry. To the contrary, the novel devices described herein provide a number of beneficial results and properties that have heretofore been unexplored, not to mention unexpected, within this area. Initially, though, as comparisons, it is important to note the stark differences involved between prior devices and those currently disclosed and broadly covered herein.

Such counterintuitive examples and results generated thereby are associated with significant changes in the application and utilization of the heretofore unexplored coupling of unique and electrode materials with thin metallized film current collectors within electrochemical cells (rechargeable batteries, capacitors, and the like). Such novel examples include at least five different alternatives, as detailed below. Alternative 1—Thin Electrode Coatings Electrodes are typically produced through the application of coatings of electrode materials on current collectors. Typically, very high-power cells can be made by taking thick metal foils and coating them with thin coatings of electrodes, thus reducing the internal resistance of the cell to the point where power can be very quickly introduced and removed. Contrary thereto such a standard practice, however, is the utilization metallized thin film current collectors and the application thereto with very thin coatings of electrode materials, as is now disclosed herein. As discussed throughout this disclosure, such a counterintuitive methodology and practice results in unexpected effective reductions in target cell internal resistance, particularly in comparison with results normally achieved with thick metal current collectors. This is contrary to current practice, where thick coatings are combined with thin metal sheets to give high energy density cells, and thin coatings are applied to thick metal sheets to give high power cells. Thus, again, the combination of ultra-thin current collector metal coatings and thin electrode materials is contrary to current art and results in an unexpectedly safe cell with low internal resistance for very high-power potential. Further in terms of standard state of the art practice is the utilization of thicker coatings to reduce the surface area of a subject current collector, and thus total weight of the cell in terms of kWh of stored energy The utilization, again, counterintuitively, of greatly reduced weight current collectors, it has been discovered, unexpectedly, that electrode coating thicknesses can be dramatically reduced, as well, resulting in the aforementioned reduction in cell internal resistance without any increase of the total weight per kWh of the target cell when compared to foil current collectors. Such a result, as well as the low resistance levels achieved through thin electrode coating applications with ultra-thin current collectors, is, without intending on being bound to any specific scientific theory, apparently associated with the ability for ions and electrons to travel quickly through the thin electrode (conductive) coatings, thus reducing the resistance thereof to the necessary high power resultant levels of target cell itself.

To achieve such a result, the metallized film (thin) current collectors must exhibit a resistivity of greater than 0.005 Ohms/square (preferably greater than 0.01, more preferably greater than 0.015, and most preferably greater than 0.025, up to about 0.5). This current collector resistivity is thus also a characteristic of the target electrochemical cells in which such collectors are present, inasmuch as the low measurements are a starting point prior to any further accommodations and modifications of electrode coating applications.

The application, then, of electrode coatings is undertaken within this alternative method of cell resistance reductions of this disclosure in terms of electrode areal energy density (lower than 4 mAh/cm$^2$, preferably lower than 3.5, more preferably lower than 3, still more preferably lower than 2.5, even more preferably lower than 2, further more preferably lower than 1.5, and most preferably less than 1), electrode coating thickness (preferably less than 70 microns, more preferably less than 60, still more preferably less than 50, even more preferably less than 40, and most preferably less than 30 microns), and/or electrode coating areal density less than 150 g/m$^2$, preferably less than 120 g/m$^2$, more preferably less than 100 g/m$^2$. In other words, the application of electrode materials exhibiting such areal energy density, coating thickness, and/or coating areal density provides the unexpected results of generating a low internal cell resistance even when a high resistance ultra-thin current collector is present.

This combination of ultra-thin current collector with very thin electrode coatings provides for electrochemical devices that exhibit the product of a capacity CAP and resistance R, CAP×R less than at most 40 mOhm-Ah (preferably at most 35, more preferably at most 30, still more preferably at most 25, and most preferably at most 20). Other ultra-thin current collector electrochemical cell devices require high resistance in relation to cell capacity. Contrary to such prior teachings, however, the utilization of the very thin electrode coatings accords an overall low resistance even with the high resistance ultra-thin current collectors present simultaneously. As such, the disclosed thin electrode coatings on ultra-thin current collectors further results in an electrochemical device with total (overall) resistance measurement of less than 15 mOhms, preferably less than 12, more preferably less than 10, still more preferably less than 8, even more preferably less than 6, further more preferably less than 4, and most preferably less than 2. Likewise, as an alternative measurement of capabilities of such a high safety/low resistance electrochemical cell (or device) is where the capacity measured at 2 C (30 minute discharge) >P*0.5 C capacity (measured at 2 hour discharge) (wherein P is at least 90%, preferably at least 85%, more preferably at least 80%, even more preferably at least 75%, and most preferably at least 70%). As well, another measurement result for such a novel high safety/low resistance (high power) electrochemical device is where 4 C (15-minute discharge) capacity>P*0.5 C capacity, wherein P is the measure as above.

Of further interest is the capability of a lithium ion battery utilizing an ultra-thin current collector for safety purposes; however, such a structure, as above, suffers from high internal resistance and subsequent high voltage drops at high currents. The utilization of a low coating thickness electrode, as discussed above, compensates for such a shortcoming unexpectedly and, again, effectively. With a capacity of the lithium ion battery cell C, the current can be measured as a C-rate (commonly referred to as the ratio of the current used in comparison to the current required to drain the cell in 1 hour). High internal resistance cells perform poorly at C-rates greater than 1 C, and would have a significantly lower measured capacity at 2 C, or at 4 C. Thus, a cell made with very thin metal current collectors that exhibit high capacities at 2 C or at 4 C would be difficult to achieve. Contrary thereto, however, the application of thin electrode coatings to ultra-thin current collectors has a surprisingly opposite effect, allowing for significantly improved and workable high capacity measurements instead. To date, there is no other manner of achieving such a result other than effectively providing for reduced internal resistance through the methodologies and operations disclosed herein for such cells.

Such measurements and physical characteristics have not been achieved in combination with ultra-thin current collectors in the past. Thus, with such thin electrode coatings, as noted above, applied to such ultra-thin current collectors, the safety aspects associated with such current collectors are retained, but the internal resistance of the subject cell is unexpectedly and effectively reduced to impart high-power charging and discharging as needed for at least come end-use rechargeable electrochemical cells that have heretofore been unavailable.

FIG. 2 shows a prior art structure of a thick coating electrode 11 applied to an ultra-thin current collector 12. Again, such a structure will exhibit a high resistivity internally within an electrochemical cell (lithium ion battery, as one non-limiting example). FIG. 3 thus shows the reduction in electrode coating thickness 15 as applied to an ultra-thin current collector 16. As noted above, this counterintuitive operation (within the state and standard of rechargeable electrochemical cells) compensates for the high resistivities exhibited by ultra-thin current collectors by imparting an internal low resistance within the target cell (as in FIG. 4). FIG. 4 thus shows the inclusion of such an ultra-thin aluminized film current collector 21 within a battery cell 20. Shown applied to the collector 21 is a thin cathode coating 22, a first separator 23 and an opposing thin anode coating 24. Further present are a second ultra-thin copperized film current collector 24 and a second separator 23a. Connected to the aluminized film current collector 21 is an internal tab 25 for contact with an external contact (not illustrated) for electrical charge transfer. Such a cell 20 exhibits, as noted throughout, the safety levels associated with ultra-thin current collector presence and the high-power capabilities associated with the counterintuitive utilization and application of thin electrode coatings on such a collector surface.

The measurements, concerns, and presentations above for the thin metallized film current collectors for Alternative 1 are also to be understood the same for the other Alternatives provided below. Thus, the current collectors described herein, in terms of structural and physical characteristics, at least, are to be considered the same for all such Alternatives (specifically to avoid restating the same paragraphs as above).

Alternative 2—High Porosity Electrode Coatings

It has also been discovered that the ability to reduce the electrical path length required for the ions plus electrons to travel through the electrode coating by reducing the coating thickness can also be achieved through the application of high porosity electrode coatings to such an ultra-thin current collector surface. In such a manner, it would appear, again, without intending any specific reliance upon any scientific theory, that such low total resistivity of a target cell is achieved through the ions and electrons to accommodate the bulk of the travel distance through such electrode coatings via porous structures, as opposed to typical low porosity types. This structural accommodation appears, as well, to allow more liquid electrolyte to penetrate deeper within the electrode, thereby apparently allowing electronic transport through the cathode solids to be reduced while still maintaining the high energy density associated with thicker coatings (even though the energy storage of the coating may be slightly reduced).

Generally, the porosity of a lithium ion electrode material is desired to be low, as high porosity increases the amount of electrolyte used and increases the volume used for a given energy storage amount. Thus, typical battery practice today utilizes batteries with calendered electrode coatings (under very high pressures) exhibiting high coating densities (or, conversely, low coating porosities). As for electrode coatings discussed above, typical high energy density cells using ultra-thin metallized current collector films include (and specifically target) the electrodes exhibiting high coating densities (low porosities). Thus, to target high porosity electrode coatings are, as above with thin electrode coatings, counterintuitive according to current practices.

High porosity can be achieved, for example, by using a relatively large particle size material for the electrode coating. Such large particles create relatively large spaces between the particles, thereby increasing the porosity of such a solid coating structure. Lower porosity layers can be achieved by using smaller particle sizes which would achieve smaller interparticle spaces. Alternatively, a distribution of particle sizes that includes small particles would also achieve low density.

Such high porosity structures may be measured in terms of tap density of such electrode materials and thus porosity calculated from such tap density measurements. The true density is the theoretical density of the materials, or for a mixture the volume normalized theoretical density. The tap density is obtained by mechanically tapping a graduated cylinder containing the sample until little further volume change is observed. The powder porosity is calculated by the following equation:

Powder Porosity=1−Tap Density/True Density

The bulk density of a coating is calculated as the weight/$m^2$ of coating divided by the volume/$m^2$. Thus, a coating that measures/exhibits 20 grams/$m^2$ and is 20 microns thick has a bulk density of 1.0 g/$cm^3$. The porosity of the coating is thus calculated by the following equation:

Coating Porosity=1−Bulk Density/True Density

With such a high porosity coating electrode applied to an ultra-thin current collector (as defined and described above in terms of resistivity measurements, such an increased (high) porosity coating imparts the same general measurements of low internal resistance for a target electrochemical cell as noted above for the thin electrode coatings alternative (s).

FIG. 5 shows a prior art structure of a low porosity coating electrode 31 applied to an ultra-thin current collector 32. Again, such a structure will exhibit a high resistivity internally within an electrochemical cell (lithium ion battery, as one non-limiting example). FIG. 6 thus shows the reduction in electrode coating thickness 35 as applied to an ultra-thin current collector 36. As noted above, this counterintuitive operation (within the state and standard of rechargeable electrochemical cells) compensates for the high resistivities exhibited by ultra-thin current collectors by imparting an internal low resistance within the target cell (as in FIG. 7). FIG. 7 thus shows the inclusion of such an ultra-thin aluminized film current collector 41 within a battery cell 40. Shown applied to the collector 41 is a high porosity cathode coating 44, a first separator 43 and an opposing high porosity anode coating 42. Further present are a second ultra-thin copperized film current collector 41a and a second separator 43a. Connected to the aluminized film current collector 41 is an internal tab 45 for contact with an external contact (not illustrated) for electrical charge transfer. Such a cell 40 exhibits, as noted throughout, the safety levels associated with ultra-thin current collector presence and the high-power capabilities associated with the counterintuitive utilization and application of thin electrode coatings on such a collector surface.

Alternative 3—High Conductivity Electrode Coatings

Conductive additives, like carbon black or graphite, are essential components of lithium ion batteries due to the limited electrical conductivity of most electrode materials. However, because the conductive additives themselves do not store lithium and thus do not contribute to the energy storage capacity of the cells, their use is minimized to make room for the maximum amount of lithium storing materials such as NMC cathode materials. Modern lithium ion batteries are made with as little as 3% conductive additive in the coating, with 3-5% being quite common.

Generally, the maximization of energy densities of typical, state of the art electrochemical cells combines the aforementioned low porosity electrode coating having low conductivity carbon content. Such a structure, as alluded to above, maximizes the active conductive material (lithium ion structures, as examples) with in the coating. The implementation of such a low porosity, low carbon content electrode coating with an ultra-thin current collector (metallized film, as an example), would create the same high resistivity cell result as discussed above. Although such a high internal resistance can also lead to high safety levels (again, as discussed above), the lack of low resistance within the cell itself would compromise the end-use capabilities thereof, limiting the power potentials dramatically. The ability, however, to increase the carbon content (conductive material levels) has not been undertaken within the rechargeable electrochemical cell industry. Thus, the ability to achieve an internal resistance of suitable low level for high volume power capabilities would be possible in accordance with this alternative, ostensibly accommodating faster conductivity through increased carbon content within such electrode materials. Such counterintuitive operations and methodologies permit combination of high resistance, ultra-thin current collector structures with a low resistance electrode material made by using more carbon in the coating and having higher porosity.

Alternative 4—Layered Electrode Coatings

Another potential structural improvement for such electrochemical cells includes the utilization of multi-layered electrodes having differing gradients. Normal electrode materials are made from a single layer of electrode material coated on a current collector. The above-noted alternative of a single thin electrode coating provides the unexpectedly effective result of low internal resistance for a target cell, particularly in combination with (and coating application upon) a high resistivity, safety level imparting, ultra-thin current collector. However, in charge and discharge, the portion of the electrode materials that are far from the current collector will incur more resistance and ohmic heating than the portion of the electrode materials that is very near to the current collector. Thus, it is advantageous to make the materials farther from the current collector in a configuration that has higher ionic and electrical conductivity than those that are closer to the current collector. Such a structure will, likewise, impart a lower resistance internally within a target cell.

This structural and physical result can be accomplished with a multilayer coating process, in which a first applied coating (being closest to the ultra-thin current collector surface) has lower porosity and/or lower conductive particle (carbon or graphite) content, and the porosity and/or conductive particle content are increased with subsequent layers (preferably, such porosity and conductive particle concentrations are increased with such subsequent layers simultaneously). The porosity increase can be achieved by reducing the pressure that is used in calendering processes for each successive layer. The conductive particle content can be increased by increasing the proportion of conductive particles included in the mixture.

Figure 8:
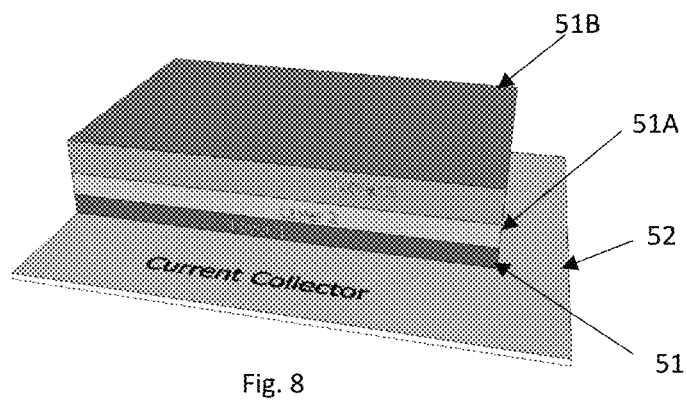
FIG. 8 is a depiction of a herein disclosed side perspective view of a multi-layer electrode applied to a thin metallized film current collector.
Figure 9:
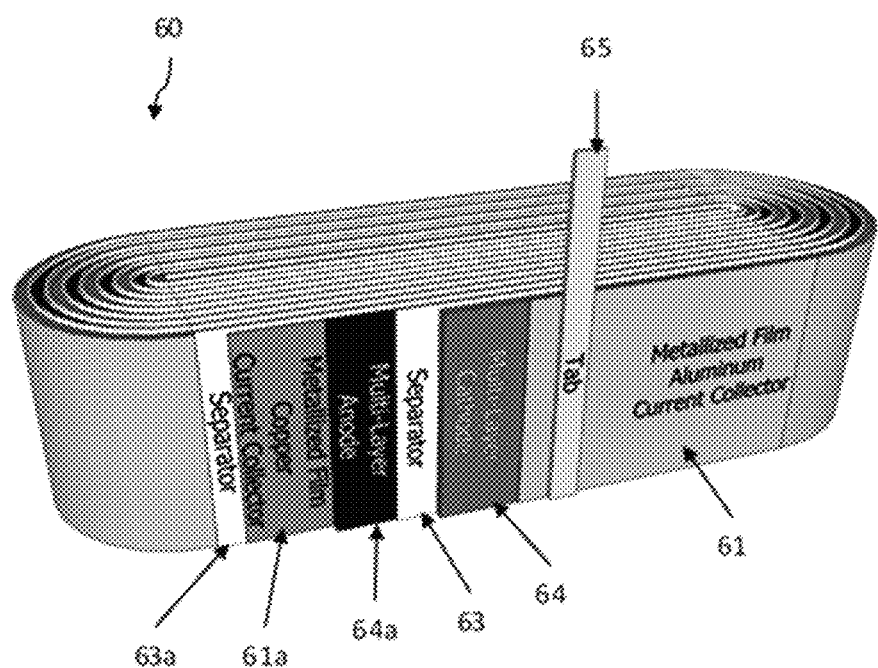
FIG. 9 is a top cross-sectional view of a jelly roll type lithium ion rechargeable battery including the multi-layer electrode/metallized film current collector of FIG. 8.

One configuration, as shown in FIG. 8, would be to have layer 1 51B, closest to the substrate (current collector 52), be very thin and highly conductive, followed by layer 2 51A, which is a low porosity, low carbon content layer, and a layer 3 51 having a higher conductive particle content and even high porosity. More layers may be applied in like fashion with, as above, each subsequent layer having higher conductive particle content and higher porosity in stepwise fashion. In another configuration, a conductive "primer" layer is eliminated, and the lowest porosity, lowest conductive particle content layer is layer 1, with each subsequent layer increasing in porosity and/or conductive particle content. FIG. 9 thus shows the utilization of a multi-layer cathode coating 64 (represented by layers 1, 2, 3 of FIG. 8, 51, 51A, 51B) applied to an ultra-thin aluminized film current collector 61 within a battery cell 60. Further present are a first separator 63 and an opposing multi-layer anode 64a (structured as for the cathode 64, but made from anodic materials, as well understood by the ordinarily skilled artisan). Such an anode is applied to a second ultra-thin copperized film current collector 61a and a second separator 63a. Connected to the aluminized film current collector 61 is an internal tab 65 for contact with an external contact (not illustrated) for electrical charge transfer. Such a cell 60 exhibits, as noted throughout, the safety levels associated with ultra-thin current collector presence and the high-power capabilities associated with the counterintuitive utilization and application of multi-layered, conductivity gradient electrode coatings on such a collector surface.

Alternative 5—Patterned Electrode Coatings

Yet another method to achieve low internal resistance through electrode material modifications from those typically undertaken within the industry, involves the application of an electrode material that may be utilized having certain patterns of conductive structures in contact with the target ultra-thin current collector surface. In such a manner, there may be applied a first coating in discrete regions (whether linear rows, linear columns, diagonal lines, spots, such as cubes, cylinders, or any other geometric three-dimensional shape, and the like) with at least a second coating in regions of the target ultra-thin current collector surface to which the first coating has not been applied. Such different coatings of electrode materials may then include any of the structural limitations and requirements noted above, including, without limitation, a first coating exhibiting high porosity, a second coating exhibit high conductivity, and any number of other coatings with differing physical results as to conductivity, and the like, as needed to provide a structure that, as above, compensates for the high resistivity levels imparted by the ultra-thin current collector itself. Thus, with such patterned coating there may be generated differing gradients in terms of resistance measures in such regions, allowing for certain regions to drive ions and electrons more quickly than other regions.

Figure 10:
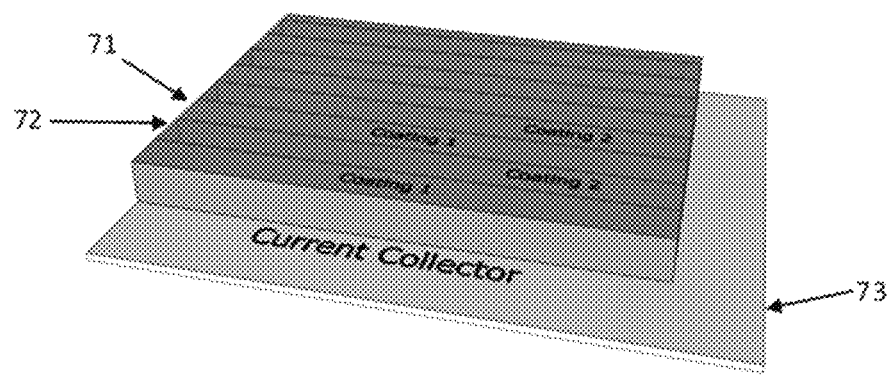
FIG. 10 is a depiction of a herein disclosed side perspective view of a patterned coating electrode applied to a thin metallized film current collector.
Figure 11:
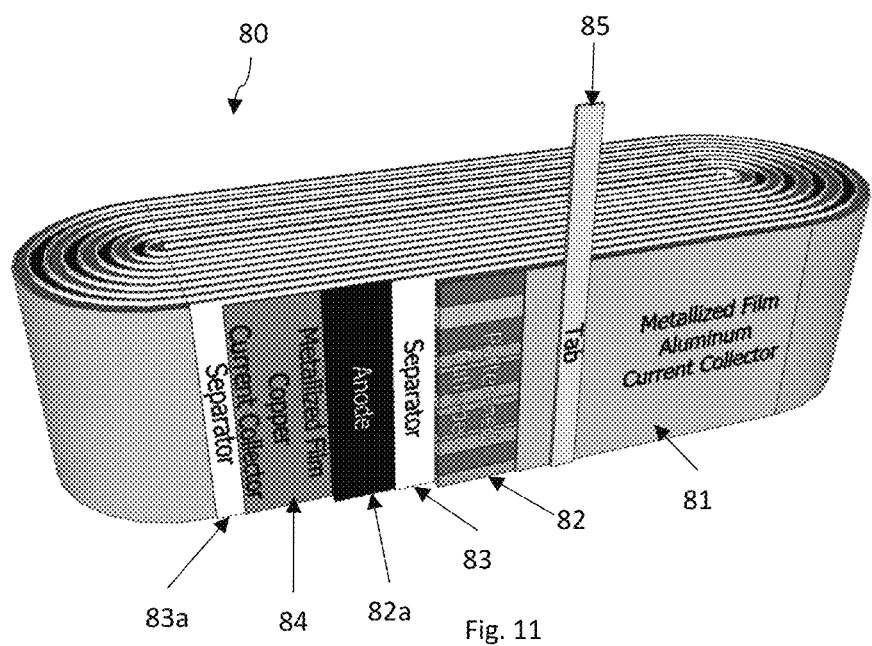
FIG. 11 is a top cross-sectional view of a jelly roll type lithium ion rechargeable battery including the patterned electrode/metallized film current collector of FIG. 10.

As such, in greater detail, FIG. 10 shows an ultra-thin current collector 73 (again, providing higher safety levels for a target cell but concomitant lower resistivity as well) having applied thereto a first coating 72 providing in three-dimensional lines and having one type of electrode configuration (such as high energy density made by using lower conductive particle content, or lower porosity achieved through such means as smaller particle size materials), and a second coating 71 interspersed therewith in three-dimensional alternating lines to the first coating 72 having differing energy densities and/or higher conductive particle concentrations/content than the first coating 72. In this case, the higher porosity and/or higher conductive particle content areas can act as "superhighways" for ions and electrons, reducing the overall resistance internally of a target cell while retaining the higher energy density of the lower porosity, lower conductive particle content areas as needed for certain purposes, if desired. FIG. 11 thus shows the inclusion of such an ultra-thin aluminized film current collector 81 within a battery cell 80. Shown applied to the collector 81 is a patterned coated cathode 82, a first separator 83 and an opposing anode coating 82a. The patterned cathodes coating 82 includes regions as defined within FIG. 10, above (71 and 72). Such an anode is applied to a second ultra-thin copperized film current collector 84 and a second separator 83*a*. Connected to the aluminized film current collector 81 is an internal tab 85 for contact with an external contact (not illustrated) for electrical charge transfer. Such a cell 80 exhibits, as noted throughout, the safety levels associated with ultra-thin current collector presence and the high-power capabilities associated with the counterintuitive utilization and application of patterned electrode coatings on such a collector surface.

Thus, it has been shown that the Examples provided above exhibit the desirable thickness, metal coating, and conductivity results needed to prevent thermal runaway within an electrolyte-containing battery, thereby providing not only a much safer and more reliable type, but one that requires far less internal weight components than ever before, without sacrificing safety, but, in fact, improving thereupon. Additionally, however, is the ability to compensate for the high resistivity levels of such an ultra-thin current collector through the application of the different types of electrodes noted herein that have heretofore not been disclosed or explored within the pertinent electrochemical cell industries. The ability to impart such low resistance internally to target cells through the combination of such unique electrodes and ultra-thin current collectors thus allows for significant improvements in terms of not only safety due to thermal runaway potentials within rechargeable and similar types of batteries and power cells, but also the ability to ensure that high power charges and discharges, as needed, for certain end-use application of such electrochemical cells are not compromised.

Having described the invention in detail it is obvious that one skilled in the art will be able to make variations and modifications thereto without departing from the scope of the present invention. Accordingly, the scope of the present invention should be determined only by the claims appended hereto.

The invention claimed is:

1. A lithium electrochemical energy generating and storage device comprising an anode, a cathode, at least one separator present between said anode and said cathode, an electrolyte, and at least one current collector in contact with at least one of said anode and said cathode; wherein said current collector exhibits a resistivity greater than 0.005 Ohm/square; wherein said device exhibits a product of capacity CAP and resistance R, CAP×R of less than 25 mOhm-Ah; wherein said electrochemical device exhibits a 2C capacity greater than 70% of the capacity measured at 0.5 C; and wherein said current collector further comprising an insulating support layer coated with at least one conductive layer, wherein said at least one conductive layer exhibits a thickness of less than 2 microns.

2. The lithium electrochemical energy generating and storage device according to claim 1 wherein said device exhibits an electrode areal energy density of less than 4.0 mAh/cm$^2$.

3. A lithium electrochemical energy generating and storage device comprising an anode, a cathode, at least one separator present between said anode and said cathode, an electrolyte, and at least one current collector in contact with at least one of said anode and said cathode; wherein said current collector exhibits a resistivity greater than 0.005 Ohm/square; wherein said device exhibits a product of capacity CAP and resistance R, CAP×R of less than 25 mOhm-Ah; wherein at least one of said anode or cathode is structured to achieve low resistivity through the inclusion of at least one of the following:
 a. an electrode exhibiting a thickness less than 70 microns;
 b. an electrode coating containing greater than 6% by weight of a conductive additive;
 c. an electrode coating exhibiting a porosity greater than 35%;
 d. an electrode coating having multiple layers; and
 e. an electrode coating exhibiting an interspersed pattern of coating materials, wherein at least one component of said pattern includes high energy, lower conductivity regions and at least one other component of said pattern includes higher conductivity regions, wherein such conductivity results from the presence of high conductive material content or high porosity material.

4. The lithium electrochemical energy generating and storage device according to claim 1 wherein said device exhibits a resistance of less than 20 mOhms.

5. The lithium electrochemical energy generating and storage device according to claim 4 wherein said device exhibits a resistance of less than 15 mOhms.

6. The lithium electrochemical energy generating and storage device according to claim 3 wherein said device exhibits a resistance of less than 20 mOhms.

7. The lithium electrochemical energy generating and storage device according to claim 6 wherein said device exhibits a resistance of less than 15 mOhms.

* * * * *